United States Patent [19]

Davidovits et al.

[11] Patent Number: 4,888,311
[45] Date of Patent: Dec. 19, 1989

[54] CERAMIC-CERAMIC COMPOSITE MATERIAL AND PRODUCTION METHOD

[76] Inventors: Nicolas Davidovits, 6 Rue Brison, F-42300 Roanne; Michel Davidovics, 5 Route de Villers, F-60700 Pont Ste Maxence; Joseph Davidovits, 16 Rue Galilee, F-02100 Saint Quentin, all of France

[21] Appl. No.: 218,286

[22] PCT Filed: Oct. 13, 1987

[86] PCT No.: PCT/FR87/00396
§ 371 Date: Jun. 10, 1988
§ 102(e) Date: Jun. 10, 1988

[87] PCT Pub. No.: WO88/02741
PCT Pub. Date: Apr. 21, 1988

[30] Foreign Application Priority Data

Oct. 14, 1986 [FR] France .................. 86 14224
Oct. 13, 1987 [FR] France .................. 87 14096

[51] Int. Cl.⁴ .................. C04B 35/84; C04B 35/16
[52] U.S. Cl. .................. 501/95; 106/84; 106/85; 106/286.2; 106/286.5; 423/328; 423/329; 427/397.7; 428/372; 428/375; 428/384; 428/388; 428/396; 428/698; 428/699; 428/701; 428/702; 428/902; 501/153; 501/154
[58] Field of Search .................. 501/95, 153, 154; 264/DIG. 19; 428/698, 699, 372, 375, 384, 388, 396, 701, 702, 902; 106/84, 85, 286.2, 286.5; 427/397.7; 423/328, 329

[56] References Cited

U.S. PATENT DOCUMENTS

| | | | |
|---|---|---|---|
| 4,284,664 | 8/1981 | Ravich, Sr. .................. | 427/180 |
| 4,349,386 | 9/1982 | Davidovits .................. | 106/85 |
| 4,472,199 | 9/1984 | Davidovits .................. | 106/85 |
| 4,509,985 | 9/1985 | Davidovits et al. .................. | 106/85 |

FOREIGN PATENT DOCUMENTS

0026687 4/1981 European Pat. Off. .
WO82/0008-16 3/1982 PCT Int'l Appl. .

OTHER PUBLICATIONS

Davidovits, "Geopolymers II–Processing and Applications of Ultra High Temperature, Inorganic Matrix Resin for Cast Composite Structures, Molds and Tools for RP/C and Metal Industries, Stable Up to 2100° F.", PACTEC '83, Annual Pacific Technical Conference, Society of Plastic Engineers, Inc., 1983, pp. 222–230.

Davidovits, "Synthesis of New High Temperature Geo-Polymers for Reinforced Plastics/Composites", PACTEC '79, 4th Annual Pacific Technical Conference and Technical Displays, Society of Plastic Engineers, Inc., 1979, pp. 151–154.

Primary Examiner—Mark L. Bell
Assistant Examiner—Anthony J. Green
Attorney, Agent, or Firm—Browdy and Neimark

[57] ABSTRACT

A composite ceramic-ceramic material is disclosed having a fibrous reinforcing ceramic and a ceramic matrix made of a geopolymeric compound containing:

(a) a poly(sialate) geopolymer $M_n(-Si-O-Al-O-)_n$ and/or poly(sialate-siloxo) $M_n(-Si-O-Al-O-Si-O-)_n$, M representing at least one alkaline cation, and n the degree of polymerization;

(b) ultrafine silicious and/or aluminous and/or silico-aluminous constituents, of size smaller than 5 microns, preferably lower than 2 microns, the said geopolymeric compound being obtained by polycondensation at a temperature between 20° C. and 120° C. of an alkaline alumino-silicate reaction mixture, the composition of the principal constituents of the said geopolymeric compound expressed in terms of mole ratios of the oxides being between or equal to following values:

$M_2O/SiO_2$—0.10 TO 0.95,
$SiO_2/Al_2O_3$—2.50 TO 6.00,
$M_2O/Al_2O_3$—0.25 TO 5.70, $M_2O$ representing either $Na_2O$ and/or $K_2O$, or a mixture of at least one alkaline oxide with CaO.

The fibrous reinforcement consists of ceramic fibres such as SiC, $Al_2O_3$, $SiO_2$, glass, carbon. The addition of alkaline sulphides and alkaline sulphites enables glass fibres to be protected against chemical attack due to the alkalinity of the matrix.

9 Claims, No Drawings

CERAMIC-CERAMIC COMPOSITE MATERIAL AND PRODUCTION METHOD

The invention relates to the description and fabrication of composite, temperature-resistant materials based on fibrous ceramics, whose ceramic matrix is a geopolymeric alumino-silicate compound resulting from an inorganic polycondensation reaction of reaction mixtures based on alkaline and/or alkaline earth silico-aluminates.

The principal object of this invention is the description of the various composite ceramic-ceramic materials, whose matrix is a geopolymeric alkaline and/or alkaline earth silico-aluminate compound. The second object of this invention is to describe the processes for obtaining these composite ceramic-ceramic materials. The polycondensation of the ceramic matrix is of the hydrothermal type. It is carried out at a temperature between 20° C. and 120° C. and is similar to that by which minerals such as synthetic zeolites or feldspars, or geopolymers of the type poly(sialate) or poly(sialate-siloxo) are obtained.

In the description of this invention, the term 'composite material' designates a material composed of 2 or several constituents in intimate contact on a microscopic scale. In the case of composite materials with organic matrices, which are the most well-known, the constituents are:

(1) an oriented or randomly disposed fibrous reinforcement which confers its properties of strength and mechanical rigidity on the finished composite material.

(2) a thermosetting or thermoplastic plastic material which can be allowed to set in the desired shape while the stresses are transmitted to the fibres.

In this invention, the fibrous reinforcement is composed of fibrous ceramics. The plastic material referred to in point (2) is a thermosetting geopolymer and the matrix so obtained is of the ceramic type.

The notion of a ceramic-ceramic composite is defined in the work by R. Naslain, 'Introduction to Composite Materials', Editions du CNRS, Paris, 1985. In chapter XVIII of this work are described the various technologies used by workers in this field to carry out impregnation into the bulk of the fibrous material of the ceramic matrix. Three procedures are known: by gas, by liquid or by solid. These methods of impregnation all have in common the requirement of extremely high temperatures accompanied by techniques for avoiding the destruction at these temperatures of the fibrous reinforcement. Liquid impregnation of a vitro-ceramic silicoaluminous matrix is generally carried out in four stages: (1) preparation of a preimpregnate using slip, (2) making a composite preform, (3) compression between 6-10 MPa at high temperature 1200°-1500 C. under controlled atmosphere, 4) ceramisation by curing at 900°-1000*° C. This technique is analogous to that used for composite materials based on an organic matrix, with, however, an essential difference in the process temperature, 100°-250° C. for organics compared with 1000°-1500° C. for ceramics.

In contrast, the ceramic-ceramic composites of this invention are characterized by their ease of production at low temperature, their resistance to temperature and their mechanical strengths. These three qualities have up to now been irreconcilable. The ease of production could be found in organic plastic materials; resistance to temperature was the characteristic property of ceramics; mechanical strength could be obtained with composite materials. The composite materials of this invention reconcile these three properties. They can be transformed at low temperatures, between 20° C. and 120° C. with the same technologies as for organic plastics, remain stable up to 1200°-1400° C., and the presence of high-performance ceramic fibres confers on them excellent mechanical properties over a very wide temperature range.

Another object of the invention is the description of manufacturing processes of several articles using the composite ceramic-ceramic material of the invention, in particular the making of small tooling and of items used in the casting of non-ferrous metals.

The ceramic matrix belongs to the geopolymer class of materials. French Pat. Nos. FR 2.464.227, FR 2.489.290, FR 2.489.291 and their European equivalents EP 26.687 and EP 66.571 (WO 82/00816), and equivalent US patents US 4,349,386 and US 4,472,199, taken out by one of the applicants, describe these inorganic polymers, or polymeric compounds of the geopolymer class of type poly(sialate) Mn (—Si—O—Al—O—)n and/or poly(sialatesiloxo) Mn(—Si—O—Al—O—Si—O—)n in which M represents at least one alkaline cation and n the degree of polymerisation, whose structures are similar to those of zeolites and feldspars. The processes for preparing these silicoaluminate geopolymers involve a hydrothermal polycondensation, yielding binders or cements capable of agglomerating various fillers, to obtain moulded objects, concretes, etc.

The applications for European Pat. Nos. EP 111,862, EP 153,097 (equivalent to U.S. Pat. No. 4,509,985), and for German Pat. Nos. DE3229339, DE3246621 and DE 3303409, also describe the use of this hydrothermal polycondensation as a binder or inorganic resin. In general, these patents are claiming an aqueous reaction mixture of alkaline or alkaline earth silico-aluminates.

This reaction mixture is used as a binder or cement to agglomerate heavy fillers, sand and aggregates. The products obtained in the above patents are concretes or items highly filled with heavy aggregates of high granulometry. They may contain strengthening products such as those currently used in cement based products. These reinforced products do not correspond to the description 'composite material' as described above, the amount of fibre being in general lower than 10% by weight compared with the mass of the material.

In contrast and in accordance with the present invention, the amount of fibre is equal to at least 30% by weight compared with the mass of composite material. It should preferably be higher, and will be of the order of 45% to 60% by weight, for 40% to 55% by weight of ceramic geopolymer matrix.

The geopolymers obtained in the processes described in the above patents have structures similar to those of minerals such as analcite, phillipsite, kaliophillite, or hydrosodalite, three dimensional silicoaluminates containing so-called zeolithic water, fixed to the inside and outside of the silico-aluminate framework. In other cases, according to the products and fillers used, the structures are amorphous to X-rays, but the products retain a more or less marked zeolithic character. The amount of zeolithic water is between 10% and 30% by weight of geopolymeric compound obtained, excluding any fillers. This zeolithic water evaporates during drying, causing quite considerable shrinkage. Large cracks and crazing forms in the material obtained. To avoid this major defect, it is absolutely essential to add fillers of dimensions greater than 50 microns, such s sand, quartz, corundum, zircon sand, mullite, fire clays.

The mixtures prepared according to the patents quoted above thus have very high viscosities, which limits their use as an impregnation resin for the fabrication of fibre-based resin materials. When it is attempted to use such mixtures to impregnate a textile or a fibre mat, the filler cannot penetrate inside the fibre network as they are too bulky. They therefore stay on the outside of the fibres. Because of this, the binder which does penetrate between the fibres contains no filler, and the condensed geopolymer between the fibres is entirely cracked, which prevents cohesion of the material.

It is generally agreed that the dimensions of fillers used for impregnating fibre networks must be lower than the diameter of a single fibre. This dimension is of the order of 5 microns. There exist very few materials suitable for use as an ultra-fine filler for impregnation, according to the invention. We can quote silica dusts, alumina dusts having dimensions lower than 1 micron down to 0.1 micron, and certain aluminosilicates such as micronised mica.

These ultra-fine materials, through their dimensions, form an integral part of the geopolymeric matrix. They behave not as a simple inert filler, but, being in the same chemical category as the geopolymers, they react at the surface with the reaction medium, thereby forming part of the alkaline alumino-silicate reaction mixture. These constituents are therefore taken into account in the proportions which determine the mole ratios of alkaline silico-aluminate reagents forming the geopolymeric matrix of the composite material. The mole ratios of the principal constituents defining the alkaline alumino-silicate mixture lie between the following values:

$M_2O/SiO_2$—0.10 TO 0.95
$SiO_2/Al_2O_3$—2.50 TO 6.00
$M_2O/Al_2O_3$ 0.25 TO 5.70

$M_2O$ representing either $Na_2O$ and /or $K_2O$, or the mixture of at least one alkaline oxide with CaO from reaction mixtures containing calcium alumino-silicates as described in patent application EP 153,097, U.S. Pat. No. 4,509,985.

The examples which follow illustrate the preparative processes and certain non-limiting properties of these composite materials whose ceramic matrix is composed of geopolymeric compounds containing:
(a) a geopolymer poly(sialate) $M_n(-Si-O-Al-O-)_n$ and-/or poly(sialate-siloxo) $M_n(-Si-O-Al-Si-O-)_n$, M representing at least one alkaline cation and n the degree of polycondensation,
(b) ultra-fine siliceous and/or aluminous and/or silicoaluminous materials, of dimensions lower than 5 microns, and preferably lower than 2 microns.

EXAMPLE 1

860 grammes of reaction mixture are prepared, containing:

$H_2O$: 17.33 moles; $K_2O$: 1.630 moles; $SiO_2$: 4.46 moles; $Al_2O_3$: 1.081 moles.

$Al_2O_3$ comes from an alumino-silicate oxide $(Si_2O_5, Al_2O_2)_n$ in which the Al cation is in 4-fold coordination with oxygens, $SiO_2$ comes from this alumino-silicate oxide, and from a solution of potassium silicate; $K_2O$ comes from the potassium silicate and anhydrous KOH. The mole ratios of reactive oxides are:

$M_2O/SiO_2$—0.36
$SiO_2/Al_2O_3$—4.12
$H_2O/Al_2O_3$—16.03
$M_2O//Al_2O_3$—1.51

Using this mixture, whose pH is 14, a carbon fibre cloth, stable in alkaline medium, is impregnated; the cloth is then covered with a plastic sheet to prevent evaporation, then placed in an oven t 85° C. for 1h30 mn. It is then removed from the mould, and after drying at 85° C., a board is obtained, whose matrix is completely cracked, crazed and having no coherence.

According to French patent 80.18971 (equivalent U.S. Pat. No. 4,472,199), to avoid this cracking, 5 to 95 parts by weight of filler must be added, in general 50 parts by weight, of granulometry higher than 50 microns. According to the examples given in this patent, to the reaction mixture are added 20 parts by weight of silico-aluminous fillers, of the fire clay type, of granulometry lower than 200 microns. A carbon fibre cloth is impregnated and scraped, then a multi-layer board is made up containing several layers of this impregnated cloth. It is covered with a plastic sheet, placed beneath a weight to ensure cohesion, and polycondensed in an oven at 85° C. for 1h30 mn. It is removed from the mould, and after drying at 85° C., a board is obtained whose flexural strength if 65 MPa. Impregnation does not take place to within the bulk of the material, and the composite material breaks very easily into separate sheets. There is no cohesion between the fibres.

EXAMPLE 2

According to the examples and claims of French patent application No. 86.14224, the following procedure is carried out. To the reaction mixture of example 1) is added 0.80 moles of sodium sulphite $Na_2SO_3$, and 0.50 moles of $SiO_2$ from silica dust, of dimensions lower than 1 micron. The mole ratios of reactive oxides are:

$(Na_2O,K_2O)/SiO_2$—0.48
$SiO_2/Al_2O_3$ 4.60
$H_2O/Al_2O_3$—16.03
$(Na_2O,K_2O)/Al_2O_3$—2.25
$SO_2/Al_2O_3$—0.74
$SO_2/SiO_2$—0.16

Adding sodium sulphite, or more generally alkaline and alkaline earth sulphides and sulphites, protects the glass fibre against corrosion due to the high alkalinity of the reaction medium. The very fluid mixture is used to impregnate a cloth of glass fibre E, silicone type, a carbon fibre taffeta and a SiC fibre taffeta. After hardening and shaping under a metal plate at 70° C. for 15 minutes, the boards are dried at 120° C. The flexural strength is 140 MPa for the glass E, 175 MPa for the carbon and 210 MPa for the SiC. Thermal treatments lower the flexural strength value for glass E, around 400° C.–450° C., whereas the value stays practically unchanged up to 800° C. for the SiC. Silicon carbide fibre, such as the proprietary brand Nicalon, is the preferred ceramic fibre in this invention. The other ceramic fibres are also usable, though they give slightly lower bending strengths. The choice of ceramic fibre is made according to the thermal or chemical environment in which the composite material of the invention is placed during its industrial use.

EXAMPLE 3

The mixture of example 2) is placed on an aluminum sheet. It is seen that there is no liberation of hydrogen, and the aluminum is not attacked, whereas simple contact of the aluminium with the reaction mixture of example (1) causes immediate appearance of a large quantity of gas, and attacking of the aluminium. If there is no attack, there is nevertheless sticking between the sulfo-silico-aluminate matrix and the aluminum. This very special property enables fabrication of composite multi-layer materials combining fibre reinforcement with sheet materials or aluminium foil, like a honeycomb. In this case, the impregnating resin serves also to effect the liaison between the impregnated fibre layers and the layer or layers of aluminium.

In examples (1), (2) and (3), instead of alkaline silicate, colloidal silicates, silica dusts or silica fumes capable of forming the corresponding alkaline silicates in the highly alkaline reaction medium, can be used. Thus, Japanese Pat. Nos. 74134599 (cf: Chemical Abstracts 082:142233, 1975), and 75150699 (cf: Chemical Abstracts 084-137974, 1976), explain the easy fabrication of 'soluble glass' (alkaline polysilicate) by reacting silica fume wastes from the manufacturing process of metallic ferrosilicones, with concentrated alkaline solutions (NaOH, KOH).

Equally, instead of the alumino-silicate oxide ($Si_2O_5$, $Al_2O_2)_n$ with 4-fold coordinated Al cation, such as described in the Davidovits patents, one can use products which contain both crystalline aluminum oxides of the corundum type, whose Al cation is hexacoordinated, and amorphous oxides of aluminium whose Al cation is tetracoordinated, without leaving the frame of reference of this invention. These silicas and aluminas dusts are found generally in smokes from the electrofusion of various alloys and refractory materials. Manufactured alkaline silicates and alumino-silicates can contain non-dissolved fine particles of silica or corundum, which fulfill the function of ultra-fine constituents of dimensions lower than 1 micron and which improve still further the mechanical strengths of the materials of this invention.

Similarly, certain industrial manufacturing processes for aluminosilicate oxides with tetracoordinated Al cation, generate also silicoaluminous oxides with hexacoordinated Al cation, whose separation is difficult, and of which the oxides $SiO_2$ and $Al_2O_3$ are taken into account in the calculation of ratios.

Separation of dissolved constituted particles is not a very financially viable industrial undertaking. This is why the amounts of these ultra-fine fillers expressed as $SiO_2$ and/or $Al_2O_3$ are taken into account in the calculation of ratios.

Fibrous composite materials with a ceramic matrix according to the invention comprise a matrix made of a geopolymeric compound containing:
(a) a geopolymer poly(sialate) $M_n(-Si-O-Al-O-)_n$ and/or poly(sialtesiloxo) $M_n(-Si-O-Al-O-Si-O-)_n$, M representing at least one alkaline cation and n the degree of polycondensation,
(b) ultrafine siliceous and/or aluminous constituents, of dimensions lower than 5 microns, preferably lower than 2 microns, the said geopolymeric compound being obtained by polycondensation at a temperature between 20° C. and 120° C. of an alkaline alumino-silicate reaction mixture, the composition of the principal constituents of the said geopolymeric compound expressed as mole ratios of the oxides is within or equal to the following values:
$M_2O/SiO_2$—0.10 TO 0.95
$SiO_2/Al_2O_3$—2.50 TO 6.00
$M_2O/Al_2O_3$—0.25 TO 5.70.

$M_2O$ representing either $Na_2O$ and/or $K_2O$, or the mixture of at least one alkaline oxide with CaO.

The reaction mixture can also contain other constituents with a special function, such as for example auxiliary impregnation products, pigments, or products to protect the fibres against chemical attack due to the high alkalinity, such as alkaline sulphides and sulphites.

The composite materials can be in the form of multi-layers with alternation or not of layers consisting of a material based on glass fibre or aluminium; the other layers can be composed of ceramic fibres known to be stable in alkaline media, such as carbon fibre, kaolin fibre, alumina fibre and SiC fibre.

EXAMPLE 4

An impregnating geopolymer resin is prepared, using the geopolymer GEOPOLYMITE 50 (trademark) manufactured by the company GEOPOLYMERE S.A.R.L., in France. GEOPOLYMITE 50 is a ready-to-use two-part resin, (A) and (B), which have to be mixed in equal parts by weight. Part (A) is a liquid hardener, part (B) is a fine powder of granulometry lower than 5 microns. The chemical analysis of the constituents is given in table 1:

TABLE 1

| Chemical analysis of GEOPOLYMITE 50 (by weight) | | | |
|---|---|---|---|
| | part (A) | part (B) | (A + B) |
| $SiO_2$ | 20.95 | 30.22 | 25.60 |
| $Al_2O_3$ | — | 28.30 | 14.15 |
| $K_2O$ | 25.98 | 0.63 | 13.30 |
| CaO | — | 28.00 | 14.00 |
| MgO | — | 2.76 | 1.38 |
| F— | — | 9.94 | 4.87 |
| $H_2O$ | 53.03 | — | 26.51 |
| total | 99.96 | 99.85 | 99.51 |

The mole ratios of oxides of the principal constituants of GEOPOLYMITE 50 are:
$M_2O/SiO_2$ 0.91
$SiO_2/Al_2O_3$ 3.10
$M_2O/Al_2O_3$ 2.82

With this GEOPOLYMITE 50 resin, a 200 g NICALON brand SiC fibre taffeta cloth is impregnated. The SiC fibre reinforcement represents 40% by weight of the impregnated material. The wet composite thus obtained is dried at 70° C. for 10 to 15 minutes, until a 10% loss in weight of water is obtained. It is then placed in a refrigerator at −17° C. The SiC fibre/GEOPOLYMITE 50 preimpregnate keeps when cold; it can be kept for several weeks under these conditions. Subsequently, polycondensation and thermosetting can be thermally initiated.

EXAMPLE 5

The preimpregnated composite material of example 4) is cut into 8 rectangles 20cm×10cm.

These rectangles are placed one on top of another and placed in a heated press at 110° C. for 7 minutes. A hard board is obtained, which is then placed in a plastic bag, and left in an oven at 70° C. for 2 hours. The board is then removed from the oven and the plastic bag. It is dried at 70° C.

The composite board has a flexural strength of 190MPa. This value is conserved up to a temperature of approximately 1000° C.

The ceramic-ceramic composite materials of the invention are extremely interesting from the point of view of industrial applications. According to the manufacturing technique used, manufactured objects will have their own particular characteristics. Either preimpregnates can be used, or impregnation can be by thread winding, or any other technique currently in use by specialist manufactures of composite materials based on organic matrices. Examples include press, autoclave and vacuum forming.

Any worker in the field will easily understand the usefulness of these composite ceramic-ceramic materials of the invention, especially when the materials of the invention are compared with materials obtained by traditional ceramic techniques. As shown in table 2, the process according to the invention affords, at 70° C., composite ceramic-ceramic materials possessing the same characteristics as those made at temperatures of the order of 1400° C. It is obvious that these high temperatures greatly limit technological applications of these materials, whereas the very low fabrication temperature for composites according to the invention enable the simple mass production of any object of any shape. The values in Table 2, for ceramic matrices, are reproduced from 37 Ceramic Source'87", pp 251-254 published by the American Ceramic Society, Columbus, Ohio (1986).

TABLE II

Comparison between
SiC Fibre/K-PSS GEOPOLYMITE Composite
and
SiC Fibre/Ceramic Matrix composites
(datas from Ceramic Source '87)

| Composite (fibre/matrix) | processing temp. deg. C. | Mean Strength MPa |
| --- | --- | --- |
| Uncoated SiC/SiC | ca.1400 | 135 |
| Coated SiC/SiC | ca.1400 | 170 |
| SiC/Li Alum. Silicate | ca.1400 | 860 |
| SiC/cordierite | ca.1400 | 170 |
| SiC/ZrO | ca.1400 | 180 |
| SiC/mullite | ca.1400 | 80 |
| SiC/mullite-30% SiC/BN | ca.1500 | 140 |
| SiC/Vycor Glass | ca.1500 | 440 |
| SiC/VPS + 50% BN | ca.1500 | 320 |
| SiC/K-PSS GEOPOLYMITE | 70 | 380 |

Objects made with the composite materials of the invention are by their very nature non-inflammable and heat-resistant. They can thus be used as a thermal shield or fire barrier. Their ease of shaping enables all kinds of objects, in boards and sheets, hollow, convex or concave, tubes. These objects would be useful in the transformation industries requiring materials having good mechanical behaviour at high temperatures. Such is the case in the plastics transformation industries where ceramic-ceramic composite materials according to the invention will enable moulds, forms and tools to be made. They will also be very useful in the manipulation of molten metals, in foundries.

In these foundary industries, there is also a constant need for objects used as small tools or equipment in metal casting. We can quote, purely as an example and by no means limiting, several objects which can be made using ceramic-ceramic composite materials according to the invention: casting ladles, pouring bushes, refractory linings, casting rings, casting chutes, insertion pyrometers, thermocouple protection sleeves, mould filling systems, pouring spouts. Objects in use up to now have been made either in cast iron or steel, ceramic or traditional silico-aluminous refractory cements. These objects are bulky, heavy and very fragile in the case of ceramic and refractory cements. For the casting of aluminium and its alloys, these objects have to be protected by a layer, called a die coating, to avoid the aluminium sticking to the walls of the object.

This die coating also plays a chemical protection role against corrosion from baths of molten non-ferrous metals. This die coating has to be renewed very frequently, involving frequent stops and considerably reducing productivity.

In contrast, it has been discovered that ceramic-ceramic composite materials according to the invention are not wetted at all by molten aluminium. Furthermore, they are not attacked by the alkalis, chlorides and other products used in aluminium refining. As a result, they can be used without die coating.

In general, the wetability of a surface by a liquid is defined by the contact angle, between a drop of the liquid and a solid surface. When this contact angle is less than 90°, wetting occurs. This is the case for contact between a drop of liquid aluminium and materials such as cast iron and silico-aluminous refractory materials. On the other hand, when the angle is greater than 90°, the liquid wets badly. This is the case for liquid aluminium and vitreous silica based ceramic. When the angle is greater than 130°, wetting does not occur at all. This is the case between liquid aluminium and graphite. For the composite materials of the invention, the angle is greater than 130°, and so molten metals do no wet their surfaces at all.

Fibre reinforcement enables very strong, lightweight objects to be made. This reinforcement can be in various ceramic fibres. In particular, it can be based on SiC (e.g. Nicalon fibre), $Al_2O_3$ (e.g. Nextel fibre) or vitreous silica. It can equally well be made of a mixture containing a combination of different ceramic fibres, glass, carbon, SiC, $Al_2O_3$, silica. Metal wires, e.g. Inconel, can also be incorporated.

The examples have been given in order to explain the properties and methods of obtaining ceramic-ceramic composite materials according to the invention. Naturally the invention should not be considered as limited by the specific examples shown, but only as set forth in the appended claims.

What is claimed as new is:

1. In a process for the manufacture of a solid ceramic-ceramic material having reinforcing ceramic fibers and a ceramic matrix including a mineral polymer of alkaline polysilicate and alkaline polysialate, comprising the steps of obtaining said composite ceramic-ceramic material by hydrothermal polycondensation of said ceramic matrix in the presence of said reinforcing ceramic fibers and a filler, the improvement wherein the composite ceramic-ceramic material includes 30 to 60 parts by weight said reinforcing ceramic fibers and said reinforcing ceramic fibers are impregnated with said mineral polymer and said filler, said filler having dimensions lower than 5 microns and being selected from the group consisting of silica dust, alumina dust and micronized mica in such quantities that the mole ratios of oxides in the mixture of said mineral polymer and filler are within or equal to the following values:

$M_2O/SiO_2$: 0.10 to 0.95

$SiO_2/Al_2O_3$: 2.50 to 6.00

$M_2O/Al_2O_3$: 0.25 to 5.70 being Na or K;

and wherein a mixture of said mineral polymer, said filler and said impregnated reinforcing ceramic fibers is hardened by polycondensation at a temperature between 20° and 120° C. to form said composite ceramic-ceramic material.

2. The process of claim 1, wherein said reinforcing ceramic fibers are SiC, $SiO_2$, $Al_2O_3$, glass or carbon.

3. Process according to claim 1, wherein the polycondensation of said mixture is initially performed at a temperature lower than 0° C. and stopped below 0°C., the initially polycondensed mixture being cold stocked then reheated for hardening.

4. Process according to claim 1, wherein alkaline and alkaline earth sulfides and sulphites are added to said mixture to protect the composite ceramic-ceramic material against chemical attack due to high alkalinity.

5. Process according to claim 3, wherein alkaline and alkaline earth sulfides and sulphites are added to said mixture to protect the composite ceramic-ceramic material against chemical attack due to high alkalinity.

6. Composite ceramic-ceramic material produced according to claim 1.

7. Composite ceramic-ceramic material produced according to claim 3.

8. Composite ceramic-ceramic material produced according to claim 4.

9. Composite ceramic-ceramic material produced according to claim 5.

* * * * *